P. B. HOLDRIDGE.
HARROW AND THE LIKE.
APPLICATION FILED APR. 5, 1915.
1,146,072.
Patented July 13, 1915.
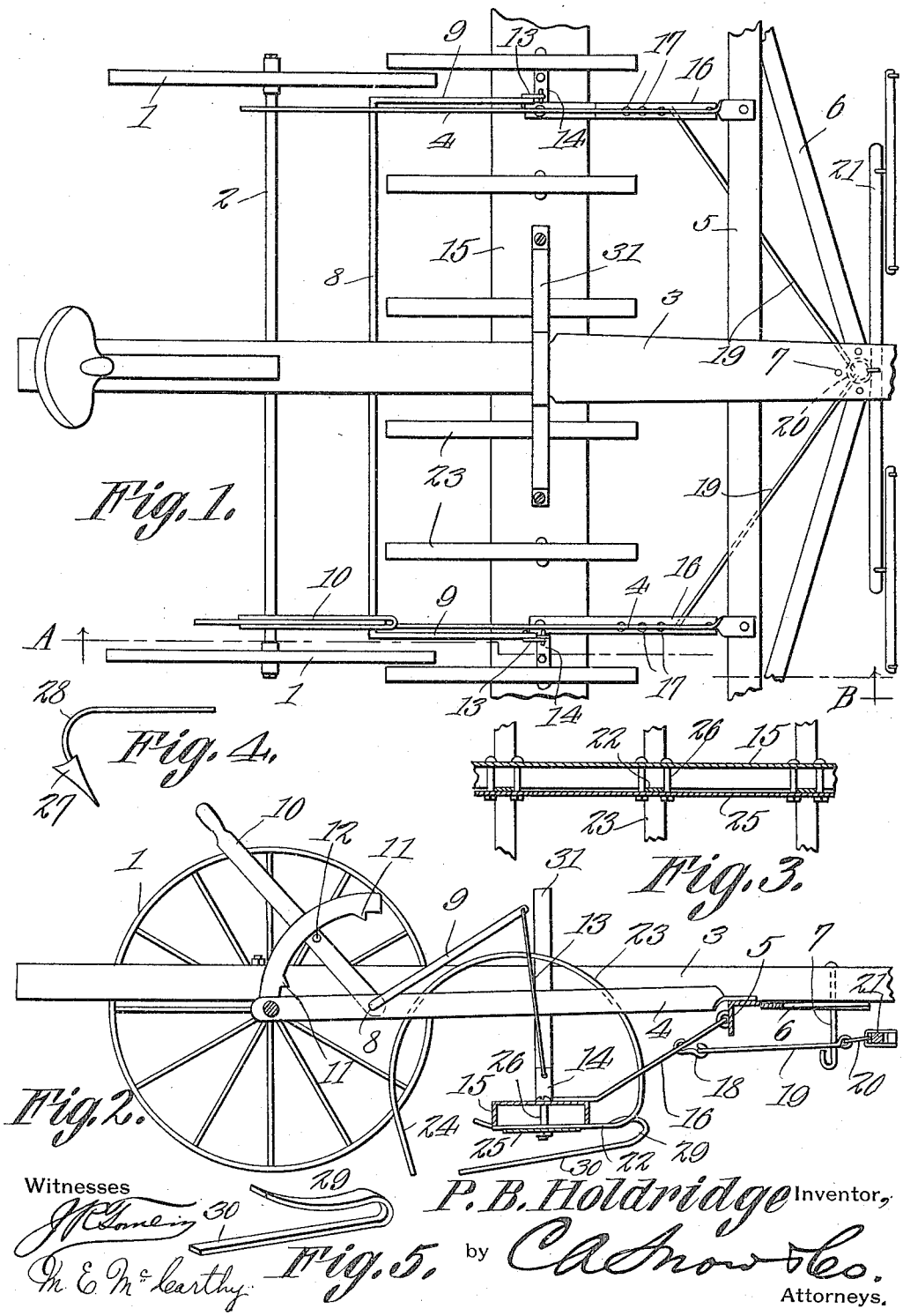

UNITED STATES PATENT OFFICE.

PLINY B. HOLDRIDGE, OF NORTH YAKIMA, WASHINGTON.

HARROW AND THE LIKE.

1,146,072. Specification of Letters Patent. Patented July 13, 1915.

Application filed April 5, 1915. Serial No. 19,233.

*To all whom it may concern:*

Be it known that I, PLINY B. HOLDRIDGE, a citizen of the United States, residing at North Yakima, in the county of Yakima and State of Washington, have invented new and useful Harrows and the like, of which the following is a specification.

This invention relates to harrows and the like especially designed for use in orchards, one of the objects of the invention being to provide a light, durable and efficient structure of this type which can be used under the branches of trees without causing injury to the branches or to the trunks of trees.

A further object is to provide a machine of this character having a novel arrangement of teeth connected to the cross beam of the machine in a novel manner, there being means employed for regulating the depth of the scar or cut produced by the teeth.

A further object is to provide a tooth carrying structure which is movable upwardly and downwardly relative to the wheel supported structure, the draft means being attached to said tooth carrying structure so that when power is applied to the harrow, the teeth will be forced into the soil the desired distances.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the middle portion of a harrow embodying the present improvements. Fig. 2 is a section on line A—B Fig. 1. Fig. 3 is a longitudinal section through a portion of the tooth carrying beam and adjacent parts. Fig. 4 is a detail view of a modified form of soil engaging device which may be used in connection with the machine. Fig. 5 is a detail view of one of the runners.

Referring to the figures by characters of reference 1 designates supporting wheels carrying an axle 2 on the middle portion of which is secured a draft beam 3 while secured upon the side portions of the axle and adjacent the wheels 1 are side strips 4 the front ends of which are attached to a cross beam 5 which can be formed of an angle strip as shown particularly in Fig. 2. Braces 6 connect this front strip 5 to the tongue 3 and depending from the tongue is a hanger 7 for the purpose hereinafter set forth.

A transverse shaft 8 is journaled in the side strips 4 and is provided at its ends with crank arms 9. This shaft has a lever 10 secured to it and a toothed segment 11 extends from one of the side strips and is adapted to be engaged by a pin 12 carried by the lever 10.

Depending from each of the crank arms 9 is a link 13 and these links are pivotally connected to brackets 14 upstanding from an inverted channel beam 15 which can be of any length desired and which extends under the side strips 4.

Upwardly and forwardly extending arms 16 are secured upon the channel beam 15 and are pivotally connected to the front beam 5 at points below the side strips 4. Each of these strips 16 has a longitudinal series of apertures 17 and any one of the apertures in each strip is adapted to receive a hook 18 provided at one end of a draft rod or chain 19, the other end of which is attached to a ring 20. A whiffle tree 21 is adapted to be connected to ring 20 so that when the draft animals are drawing the machine forwardly, the pull exerted thereby will be through the ring 20, connections 19 and hooks 18 to the arms 16 whereby the beam 15 is pulled forwardly and is pressed downwardly toward the ground with varying degrees of pressure, such pressure being dependent upon the distance of the hooks 18 from the upper ends of the arms 16.

Extending under the beam 15 is the straight attaching end or terminal 22 of each of the harrow teeth. From this straight terminal portion, each harrow tooth is curved upwardly and rearwardly as shown at 23 and merges into a downwardly extending terminal 24 disposed back of the beam 15 and extending therebelow. Extending under the terminal portions 22 is a binding plate 25 connected to the top portion of the beam 15 by means of bolts 26 disposed in pairs, the bolts of each pair being located adjacent opposite sides of one tooth, as shown particularly in Fig. 3. By tightening these bolts the plate 25 can be caused to press upwardly against the terminal portions 22 so as to bind said portions against the lower edges of the beam 15 and thus hold the teeth positively against displacement.

It will be apparent that when the machine is drawn forward, power will be applied to the arms 16 and said arms will be caused to swing downwardly, thus to force the free ends of the teeth into engagement with the ground. The leverage obtained will be dependent upon the distance between the hooks 18 and the forward ends of the arms 16. The downward movement of the beam 15 can be limited by means of the lever 10 being adjusted so as to bring the pin 12 into engagement with a tooth. By means of this lever the teeth can be lifted entirely out of engagement with the ground so that the machine can be drawn from place to place. The hooked hanger 7 constitutes means for supporting the draft devices while they are not in use.

Instead of using harrow teeth, cultivator shovels can be employed, the same being connected in the same manner as the harrow teeth and one of them being shown in detail in Fig. 4. In said figure the soil engaging blade has been indicated at 27 and the attaching standard or strip has been shown at 28.

In addition to the soil engaging devices described, runners, one of which has been shown in detail in Fig. 5, may be employed, each runner being made up of a long strip of metal bent as shown to provide a top or attaching strip 29 and a base strip 30. These runners operate to limit the downward movement of the soil engaging devices into the soil.

For the purpose of preventing lateral displacement of the beam 15 relative to the rest of the machine, a yoke 31 is extended upwardly from the middle portion of the beam and straddles the tongue 3, this yoke being mounted to work freely relative to the tongue.

Importance is attached to the fact that by arranging the draft devices in the manner described, the weight of the tongue 3 and the parts connected thereto will be lifted from the draft animals in proportion to the pulling power exerted thereby, this being due to the fact that as the pull increases through the connection 19, the soil engaging devices are moved downwardly with greater force and an upward thrust is exerted through the connection 16 upon the beam 5 and tongue 3. By providing the pin 12, lever 10 can work freely back and forth through a considerable area before becoming locked by the pin 12 engaging the teeth on the segment 11.

What is claimed is:—

1. In a cultivator, an inverted channeled beam, soil engaging devices having portions extending under the channeled beam throughout the width thereof, and a clamping plate extending throughout the length of the beam and bearing upwardly against said portions of the soil engaging devices.

2. In a cultivator, a wheel supported structure, an inverted channel beam extending transversely thereunder, connections between said beam and the front portion of the structure, draft devices attached to said connections, soil engaging devices having portions extended under the channel beam throughout the width thereof, and a clamping plate extending throughout the length of the beam and bearing upwardly against said portions of the soil engaging devices.

3. In a cultivator, a wheel supported structure, an inverted channel beam extending transversely thereunder, upwardly and forwardly extending connections between said beam and the front portion of the structure, draft devices adjustably attached to said connections, soil engaging devices having portions extended under the channel beam throughout the width thereof, a clamping plate extending throughout the length of the beam and bearing upwardly against said portions of the soil engaging devices, and means adjacent each side of each of said soil engaging devices for attaching the plate to the channel beam and for holding said devices against lateral displacement.

4. In a cultivator, an inverted channel beam, soil engaging devices each having one end portion extending from front to rear across the lower face of the channel beam, a clamping plate extending under said portion, and means extending through the channel beam and plate and close to each side of the engaged portion of the soil engaging device, for clamping the plate upon said portion and for holding the soil engaging device against lateral displacement.

In testimony that I claim the foregoing as my own, I have hereto affixed my signature in the presence of two witnesses.

PLINY B. HOLDRIDGE.

Witnesses:
 B. F. BIVINS,
 BESS MARTIN HOLDRIDGE.

Copies of this patent may be obtained for five cents each, by addressing the "Commissioner of Patents, Washington, D. C."